N. M. HOPKINS.
ELECTROMAGNETIC TACHOMETER.
APPLICATION FILED FEB. 10, 1911.

1,093,271.

Patented Apr. 14, 1914.
2 SHEETS—SHEET 1.

Witnesses:
N. P. Leonard.
R. I. Hulsizer.

Inventor:
Nevil Monroe Hopkins
by Byrnes, Townsend & Brickenstein
Att'ys

N. M. HOPKINS.
ELECTROMAGNETIC TACHOMETER.
APPLICATION FILED FEB. 10, 1911.

1,093,271.

Patented Apr. 14, 1914.
2 SHEETS—SHEET 2.

Witnesses:
N. P. Leonard.
R. I. Hulsizer.

Inventor:
Nevil Monroe Hopkins,
by Byrnes, Townsend & Beckwith,
Attys.

UNITED STATES PATENT OFFICE.

NEVIL MONROE HOPKINS, OF WASHINGTON, DISTRICT OF COLUMBIA, ASSIGNOR, BY MESNE ASSIGNMENTS, TO THE ELECTRIC TACHOMETER COMPANY, OF PHILADELPHIA, PENNSYLVANIA, A CORPORATION OF NEW JERSEY.

ELECTROMAGNETIC TACHOMETER.

1,093,271. Specification of Letters Patent. Patented Apr. 14, 1914.

Application filed February 10, 1911. Serial No. 607,802.

*To all whom it may concern:*

Be it known that I, NEVIL MONROE HOPKINS, a citizen of the United States, residing at Washington, in the District of Columbia, have invented certain new and useful Improvements in Electromagnetic Tachometers, of which the following is a specification.

This tachometer is especially designed for use on automobiles, and comprises an indicating instrument having an electromagnetic system wound and connected to provide a rotating magnetic field, a rotor in inductive relation thereto, carrying a pointer and moving against the resistance of a spring, and a source of alternating current driven through reduction-gears by the automobile-wheel or shaft.

The preferred electromagnetic system is one receiving single-phase current, direct current being supplied by a battery and converted into alternating current by a commutator journaled in a water- and dust-proof case mounted on a steering-knuckle of the automobile. The commutator is driven by fine-toothed reduction-gears within the case, the high-speed countershaft having an external pinion with coarse teeth meshing with a spur-gear on the adjacent automobile wheel. The reduction of commutator-speed effected by the inclosed gears diminishes the vibration of the brushes and their otherwise imperfect contact with the segments, decreases the wear of both, and keeps the frequency of the alternating current delivered low enough to avoid undue losses by hysteresis in the magnet-cores.

The commutator segments and brushes are made of inoxidizable precious metals or alloys, to give the minimum contact-resistance and prevent changes of resistance by corrosion. The rotor of the indicating instrument preferably consists of a thin cup of aluminum or magnesium, on the rim of which is secured a band of copper or silver, this construction giving minimum weight and maximum torque.

Figure 1:
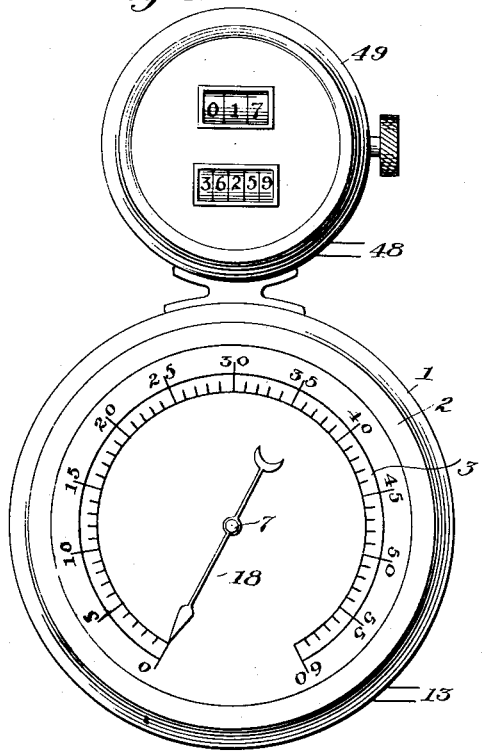
Figure 2:
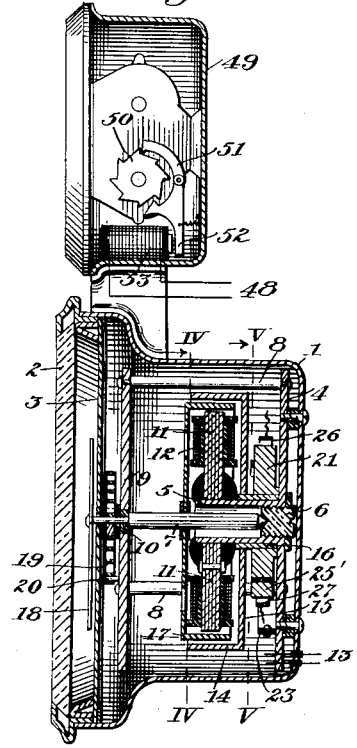
Figure 3:
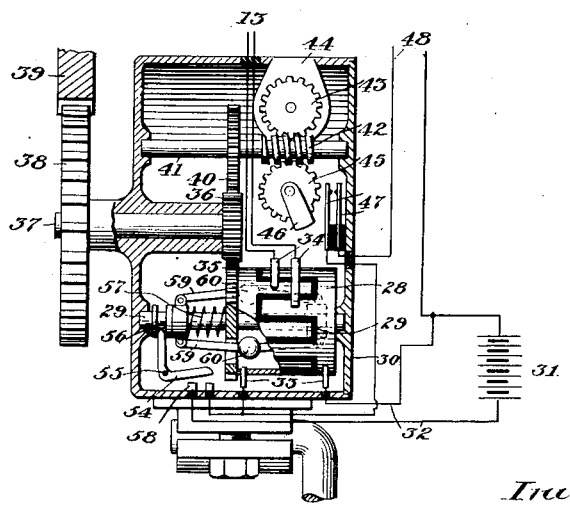
Figure 4:
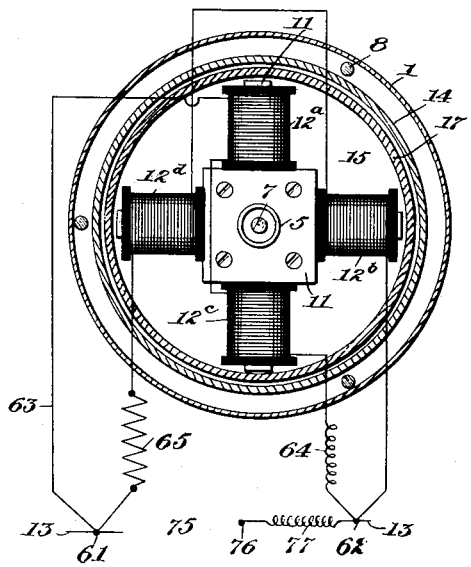
Figure 5:
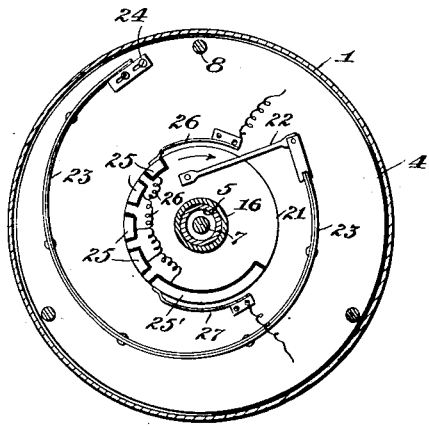
Figure 6:
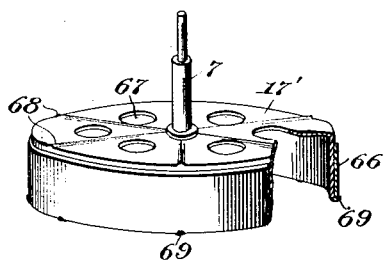
Figure 7:
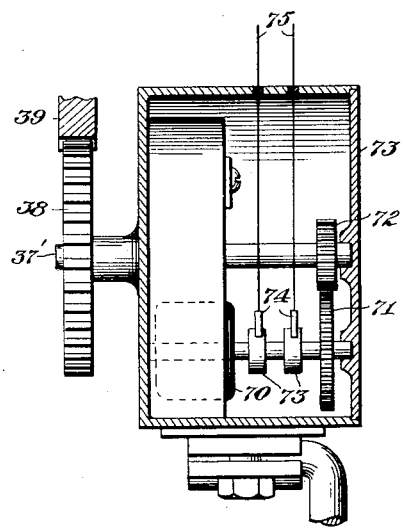

Referring to the accompanying drawings: Figure 1 is a face view of the speed-indicating instrument and an electromagnetic odometer mounted thereon; Fig. 2 is a vertical central section of the same; Fig. 3 is a vertical longitudinal section through the case of a commutator for converting battery current into single-phase current, the mechanism being shown in elevation; also illustrating an inclosed odometer and a contact-maker for the electromagnetic odometer; Fig. 4 is a transverse section of the speed-indicating instrument on the line IV—IV of Fig. 2; Fig. 5 is a transverse section of the same on the line V—V of Fig. 2, showing automatic means for compensating the varying resistance of the electric circuit at different temperatures; Fig. 6 is a perspective view of a bi-metallic rotor, partly broken away; and Fig. 7 is a vertical longitudinal section through the case of magneto generator for supplying single-phase current.

The speed-indicating instrument shown in Figs. 1 and 2 comprises a case 1 having a glass front 2 and a dial 3, graduated in miles per hour. Screwed to the bottom of the case is a disk 4, carrying a central tube 5 into which is screwed a plug 6 having a conical seat for the shaft 7 of the rotor. Secured to disk 4 are posts 8 which carry an upper plate 9 containing a bearing 10 for the upper end of the rotor-shaft. Centrally supported in the case is an electromagnet, consisting of a series of superposed sheet-iron pieces 11 providing four radial pole-pieces. Each pole piece carries a winding 12 and the four windings are connected to receive single-phase current through leads 13 and provide a rotating magnetic field. Surrounding and spaced away from the ends of the pole-pieces 11 is an iron ring 14, flanged outward at right angles from a disk 15, having a sleeve 16 revolubly mounted on the tube 5. The rotor consists of a light cup of aluminum or lacquered magnesium 17, fixed on the shaft 7, its rim extending between the pole-pieces 11 and the iron ring 14, the magnetic lines of force passing through the relatively thick rim and to and through the iron ring. The upper end of this shaft carries a pointer 18 indicating speed on the dial 3. The torque of the rotor, urged in one direction by the inductive action of the rotating electromagnetic field, is opposed by the hair-spring 19, one end of which is secured to the shaft 7 and the other end to the pin 20 projecting outward from the disk 9.

Means is provided for automatically compensating the changes in the resistance of the electric circuit due to changes in temperature. This means, shown in section in Fig. 2 and in plan in Fig. 5, comprises a disk 21 revolubly mounted on the sleeve 16, to which is connected by a link 22 one end of a bi-metallic strip 23, the other end of which is adjustably secured to the disk 4 by a slotted block and screws 24. Secured in the periphery of the disk 21, but insulated therefrom, are a number of metal segments 25, 25', electrically connected through separate resistances 26. The segment 25' extends through an arc of somewhat greater length than that occupied by all of the segments 25. A contact-spring 26 is arranged to bear successively on the segments 25, and finally on the long segment 25', as the disk 21 is rotated by the strip 23, changing its position with changes in temperature. A contact-spring 27 bears continuously on the segment 25'. The strip 23 stands in the position shown when the temperature is at a minimum. As the temperature rises, and the resistance of the magnet windings and connections, of copper, increases, the strip 23 uncoils, thereby shifting the disk 21 in a clockwise direction and bringing the spring 25 successively in contact with different segments 25, progressively cutting out different resistances 26. At the point of maximum temperature, both springs 26 and 27 bear on the long segment 25', all of the resistances 26 being thereby short-circuited.

Fig. 3 illustrates a commutator, driven by the automobile, for converting battery current into single-phase alternating current and energizing the speed-indicator electromagnet. The commutator 28 is fixed on a shaft 29 the ends of which are journaled in the walls of a water- and dust-proof case 30. Current is continuously supplied to the commutator from a battery 31, through the leads 32 and brushes 33. Single-phase current is taken from the commutator by the brushes 34 having the external leads 13. The commutator is driven by fine-toothed reduction-gears 35, 36, the pinion 36 being fixed on a countershaft 37 carrying an external coarse-toothed pinion 38 which meshes with the usual spur-gear 39 on the automobile wheel. The internal pinion 36 also meshes with an upper gear 40, fixed on a shaft 41 carrying a worm-gear 42 which meshes with the driving-gear 43 of an inclosed odometer 44. The worm 42 also drives a gear 45 on a shaft carrying a cam 46. This cam intermittently brings two springs 47 into contact and thereby closes a shunt circuit 48 leading from the battery 31 to an electromagnetic odometer 49 mounted on the speed-indicator, as shown in Figs. 1 and 2. The registering disks of this odometer are actuated through a ratchet-wheel 50 and double-toothed pawl 51 by an armature 52 facing the pole of an electromagnet 53 in the circuit 48. In order to open the circuits 32, 48 and prevent loss of battery-current when the automobile is not running, a switch 54 is provided. This switch has an intermediate pivot 55 and its upper end is forked and engages a grooved collar 56 splined on the commutator-shaft 29. A compression-spring 57 normally throws the collar 56 to the left and holds the switch 54 out of contact with the switch-points 58 of the circuit 48. A centrifugal governor is provided to close the switch when the automobile is running, comprising links 59, two of which are pivoted to the collar, having heavy balls 60 which are thrown outward when the shaft 29 is rotated, forcing the collar 56 to the right and closing the battery-circuit 32. The reduction-gears 35, 36 drive the commutator 28 at such reduced speed that the brushes 33, 34 smoothly maintain contact therewith, excessive vibration and imperfect contact being avoided. These reduction-gears, having fine teeth and being inclosed, drive the commutator smoothly and are shielded from dust and grit. In order that the contact-resistance of the commutator segments and brushes may be a minimum and invariable, these segments and brushes are made of inoxidizable precious metals or alloys. The segments are preferably made of or faced with platinum, and the brushes of gold, then being somewhat softer than the segments so that they will be worn out first, being readily replaced.

Fig. 4 shows the connections of the magnet-windings of the tachometer, supplied with single-phase alternating current from the commutator 28 through the leads 13, rheostat 25 and terminals 61, 62. The four radial magnet poles $12^a$, $12^b$, $12^c$, $12^d$ are ninety degrees apart. One meter lead 63 extends from terminal 61 to one end of winding $12^a$. The other end of this winding is connected to one end of winding $12^c$, and the other end of the latter, through an inductance coil 64, to the other terminal 62. Terminal 61 is also connected, through a non-inductive resistance 65, equal in amount to the resistance of coil 64, to one end of winding $12^d$. The other end of winding $12^d$ is connected to one end of winding $12^b$, and the other end of the latter directly to the terminal 62. When single-phase current is supplied to the terminals 61, 62, the inductance of coil 64 causes the current in the windings $12^a$, $12^c$ to lag behind the current flowing directly through the windings $12^b$, $12^d$, thus producing a rotating magnetic field.

Fig. 6 illustrates a modified rotor, consisting of an inverted cup 17' of aluminum or lacquered magnesium, surrounded by a band 66 of copper or silver. For lightness and rigidity, the base of the cup 17' has perforations 67 and hollow pressed ribs 68. The band 66 is held by lugs 69 projecting from and integral with the rim of cup 17'.

Fig. 7 illustrates a magneto generator for supplying single-phase current, its armature 70 being driven through fine-toothed reduction-gears 71, 72 within the case 73 by an external coarse-toothed pinion 38 on the counter-shaft 37', the pinion engaging a spur-gear 39 on the automobile wheel. Current is taken from the collector rings 73 by brushes 74 having external leads 75. When this magneto is used as a source of current, instead of a battery and commutator, one of its leads 75 is connected to the meter terminal 61 and the other is connected to a third terminal 76, which in turn is connected to the terminal 62 through a supplemental inductance coil 77. This coil serves to choke back and maintain more uniform the current delivered by the magneto, as its speed and electromotive force rise.

I claim:

1. A tachometer, comprising an electromagnetic system constructed to provide a rotating magnetic field, a speed-indicating rotor in inductive relation thereto, consisting of a cup having a thin web and a thicker rim, yielding means for opposing the torque of said rotor, and means for supplying electric current to said electromagnetic system, including a member driven by the wheel or shaft whose speed is to be measured.

2. A tachometer, comprising an electromagnetic system constructed to provide a rotating magnetic field, a speed-indicating rotor in inductive relation thereto, having a relatively thick rim of concentric annuli, yielding means for opposing the torque of said rotor, and means for supplying electric current to said electromagnetic system, including a member driven by the wheel or shaft whose speed is to be measured.

3. A tachometer, comprising an electromagnetic system constructed to provide a rotating magnetic field, a speed-indicating rotor in inductive relation thereto, consisting of a cup of metal of relatively low specific gravity and electric conductivity, and a band, secured to the rim of said cup, of metal of relatively high specific gravity and electric conductivity, yielding means for opposing the torque of said rotor, and means for supplying electric current to said electromagnetic system, including a member driven by the wheel or shaft whose speed is to be measured.

4. A tachometer, comprising an indicator member and a winding or windings adapted to receive electric current and actuate said indicator member, means for supplying electric current to said winding or windings, including a member driven by the wheel or shaft whose speed is to be measured, and a thermostatic temperature-regulator in the electric circuit of said tachometer, consisting of a rheostat and a temperature-responsive member controlling the resistance of said rheostat.

5. A tachometer, comprising an indicator member and a winding or windings adapted to receive electric current and actuate said indicator member, means for supplying electric current to said winding or windings, including a member driven by the wheel or shaft whose speed is to be measured, and a thermostatic temperature-regulator in the electric circuit of said tachometer, consisting of a revoluble disk having insulated segments connected through resistances, and a bi-metallic strip fixed at one end and connected at its other end to said disk.

6. A tachometer, comprising an indicator member and a winding or windings adapted to receive electric current and actuate said indicator member, a battery, a commutator driven by the wheel or shaft whose speed is to be measured, constructed and connected to receive current from said battery and deliver alternating current to said winding or windings, a switch in the battery-circuit, and means, actuated by the commutator-driving mechanism, for closing said switch.

7. A tachometer, comprising an indicator member and a winding or windings adapted to receive electric current and actuate said indicator member, a battery, a commutator driven by the wheel or shaft whose speed is to be measured, constructed and connected to receive current from said battery and deliver alternating current to said winding or windings, a switch in the battery-circuit, and a centrifugal governor, actuated by the commutator-driving mechanism, for closing said switch.

In testimony whereof, I affix my signature in presence of two witnesses.

NEVIL MONROE HOPKINS.

Witnesses:
 EUGENE A. BYRNES,
 C. W. FOWLER.